July 2, 1963     T. F. O'CONNELL     3,096,067
SEAT DEVICE FOR A SHOWER-BATH STALL
Filed Jan. 16, 1961     2 Sheets-Sheet 1

INVENTOR.
Thomas F. O'Connell
BY Harold E. Cole
Attorney

July 2, 1963 T. F. O'CONNELL 3,096,067
SEAT DEVICE FOR A SHOWER-BATH STALL
Filed Jan. 16, 1961 2 Sheets-Sheet 2

INVENTOR.
Thomas F. O'Connell
BY Harold E. Cole
Attorney 3,096,067
SEAT DEVICE FOR A SHOWER-BATH STALL
Thomas F. O'Connell, Drake's Island Road, Wells, Maine
Filed Jan. 16, 1961, Ser. No. 82,782
3 Claims. (Cl. 248—436)

This invention relates to a seat device for use in a shower-bath stall.

One object of my invention is to provide a convenient seat device that is adjustable and which can be so positioned within a shower-bath stall that no slippage of the seat device occurs, even though the stalls vary in area dimensions.

Another object is to provide such a seat that can be folded, hence is convenient to carry and occupies little space except when in use.

A further object is to so construct said seat that it can be manufactured at a relatively low cost, is light in weight and is durable.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

FIG. 3 is an enlarged, sectional view taken on the line 3—3 of FIG. 1.

FIG. 4 is an enlarged, sectional view taken on the line 4—4 of FIG. 2.

Figure 1:
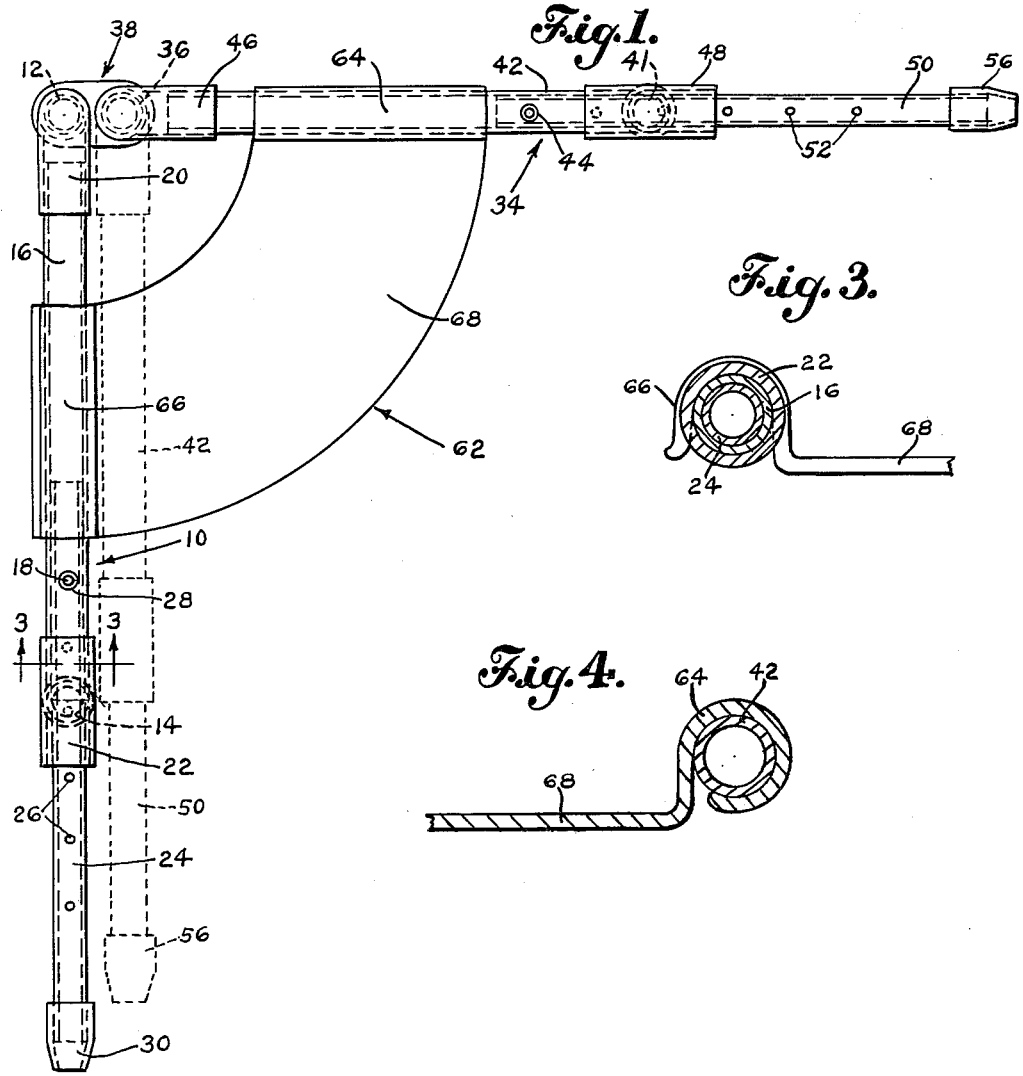
FIG. 1 is a top plan view of my seat device shown in position of use, the dash lines indicating a position of a supporting member when the seat is folded.
Figure 2:
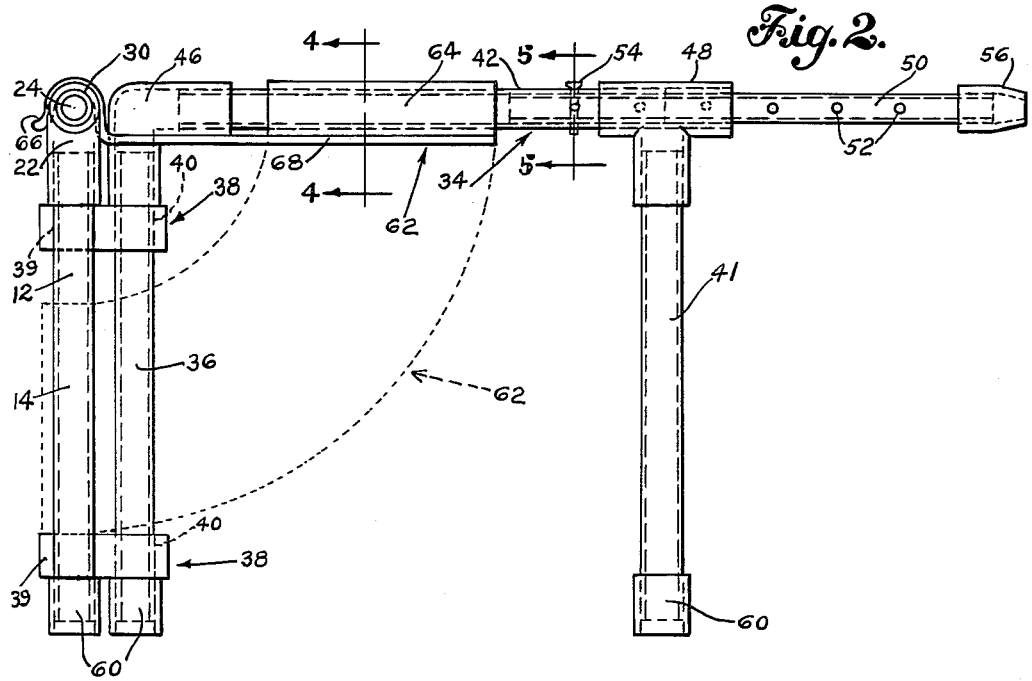
FIG. 2 is a side elevational view showing my seat device in position of use, the dash lines indicating the position of the seat portion when the seat device is disconnected from one arm.

As illustrated, my seat has a supporting member 10 which may be about 15-inches high, for instances, and extends horizontally about 24 to 30 inches, although the size will vary. It may be made of materials such as aluminum, copper or plastic.

Said supporting member has a rear leg 12, a front leg 14 and a tubular supporting arm 16 connected to and extending between said legs. Said arm 16 has a hole 18 extending therethrough for a purpose later described. An elbow 20 connects said rear leg 12 and said arm 16. A T 22 connects said front leg 14 and said arm 16.

An extension member 24 extends into said tubular arm 16 and is of such length that it may extend outwardly beyond the outer end of said arm 16 as desired. It has several holes 26 therein and is held in any desired position relative to said arm 16 by a pin 28 that extends into said arm hole 18 and into one of said holes 26 as shown in said FIG. 5. A rubber or yielding tip 30 is preferably at the end of said extension member 24.

Another supporting member 34, similar to said member 10 and movable relative thereto, has a rear leg 36. A connector 38 has a hole 39 that receives tightly said rear leg 12 while said rear leg 36 movably extends into another hole 40 in said connector 38. Thus said leg 36 is freely rotatable in said sleeve 40, swinging said arm 42 with it to either open or closed position. There may be more than one said connector 38 if desired, and I have shown two. A tubular supporting arm 42 extends between a front leg 41 and said rear leg 36 forming part of said other supporting member 34. Said arm 42 has a hole 44 therein similar to hole 18. An elbow 46 connects said rear leg 36 and said arm 42, while a T 48 connects said front leg 41 and said arm 42.

An extension member 50 extends into said tubular arm 42 and is of such length that it may extend outwardly well beyond said arm 42 to a desired position. It has several holes 52 therein and is held in any desired position by a pin 54 that extends into said arm holes 44 and one of said holes 52. A rubber or yielding tip 56 is shown at the end of said extension member 50. Said legs 12, 14, 36 and 41 preferably have rubber tips 60 at the bottom.

Figure 6:
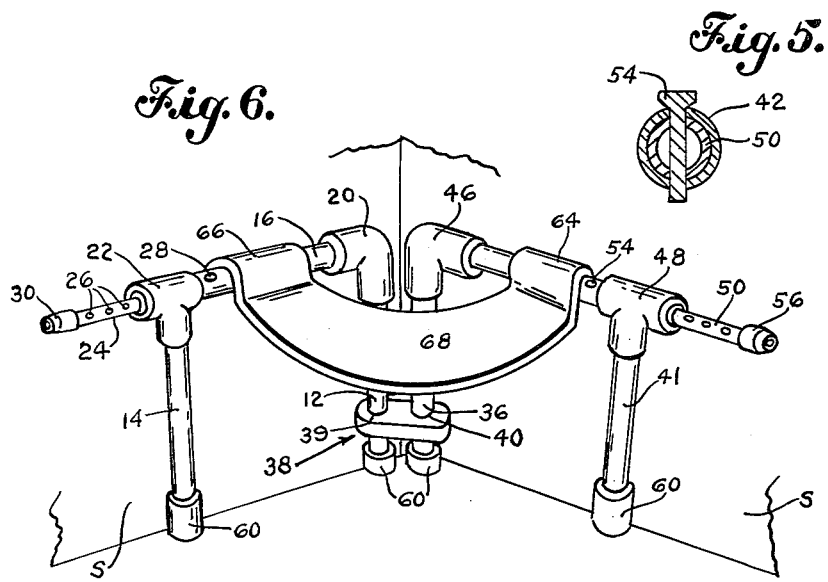
FIG. 6 is a perspective view of my seat device in position of use within a shower-bath stall.

A seat member 62 is supported by said supporting members 10 and 34, resting on said arms 16 and 42 and extending between them. It has a retainer 64 at one side that is rotatably and slidably attached to said arm 42, while at the opposite side there is a retainer 66 that is removably attached to said arm 16, and there is a seat portion 68 extending from and between said retainers 64 and 66. Said retainer 66 can easily be disconnected from said arm 42 when desired, so that my seat device can be folded. To do this said retainer 66 is disconnected from said arm 16 and said retainer 64 is slid outwardly on said arm 42 to permit said seat portion 68 and said retainer 66 to hang downwardly as shown in said FIG. 6.

Figure 5:
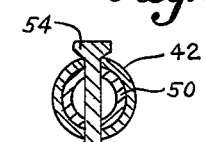
FIG. 5 is an enlarged, sectional view taken on the line 5—5 of FIG. 2.

In taking a shower bath while sitting on my seat device it is desirable that no sliding movement takes place on the floor of a shower stall S, hence said rear legs 12 and 36 are placed at one extremity of said shower stall and said extension members 24 and 50 are drawn outwardly until each reaches a side of said shower stall, that is at right angles to each other as shown in said FIGS. 1 and 5. It is intended that said supporting members 10 and 34 shall extend at right angles to each other with said rear legs 12 and 36 in the position shown in said FIGS. 1 and 5 so no slipping of my seat in the shower stall will take place.

The height of said legs preferably should be such that said seat member 62 will clear the floor when my device is in folded position.

What I claim is:

1. A seat device comprising two supporting members each embodying a rear leg, a front leg and a supporting arm between and connected to said legs, a connector connected to said rear legs and movably holding one of said rear legs whereby one said arm and one said front leg may be moved to position in angular relationship to said other arm and front leg, and a seat member supported by and extending between said supporting members in position of use, embodying means attaching one said arm to said seat member and means removably connecting said seat member to the other said arm, and two extension members one each of which extends into one of each said tubular arms whereby said extension members may extend beyond said front legs and arms.

2. A seat device comprising two supporting members each embodying a rear leg, a front leg, and a supporting arm between and connected to said legs, T members connecting said front legs and said supporting arms, elbows connecting said rear legs and said arms, a connector connected to said rear legs and movably holding one of said rear legs whereby one said arm and one said front leg may be moved to position in angular relationship to said other arm and front leg, and a seat member supported by and extending between said supporting members in position of use embodying means attaching one said arm to said seat member and means removably connecting said seat member to the other said arm.

3. A seat device comprising two supporting members each embodying a rear leg, a front leg, and a tubular supporting arm between and connected to said legs, T members connecting said front legs and said supporting arms, elbows connecting said rear legs and said arms, a connector connected to said rear legs and movably holding one of said rear legs whereby one said arm and one said front leg may be moved to position in angular relationship to said other arm and front leg, and a seat member supported by and extending between said supporting members in position of use embodying means attaching one said arm to said seat member and means removably connecting said seat member to the other said arm, and two extension members extending into said arms and adapted to extend beyond said T members and arms in position of use.

References Cited in the file of this patent

UNITED STATES PATENTS

| | | |
|---|---|---|
| 484,240 | Rieckert | Oct. 11, 1892 |
| 972,217 | Neubecker | Oct. 11, 1910 |
| 1,213,043 | Walker et al. | Jan. 16, 1917 |
| 1,239,472 | Florian | Sept. 11, 1917 |
| 1,627,241 | Johnson | May 2, 1927 |
| 1,629,718 | Lockard et al. | May 24, 1927 |
| 1,664,470 | Trigonis | Apr. 3, 1928 |
| 2,176,772 | Smith | Oct. 17, 1939 |
| 2,432,945 | Sonner | Dec. 16, 1947 |
| 2,502,181 | Stacey | Mar. 28, 1950 |
| 2,788,055 | Tumas | Apr. 9, 1957 |